Sept. 29, 1970         W. B. BIRCH         3,531,636
ORNAMENTAL LIGHT FIXTURE
Filed June 26, 1968         4 Sheets-Sheet 1
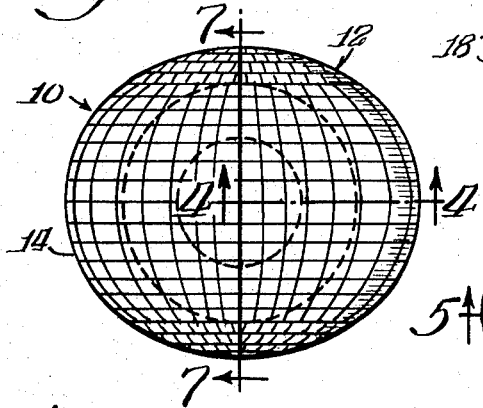
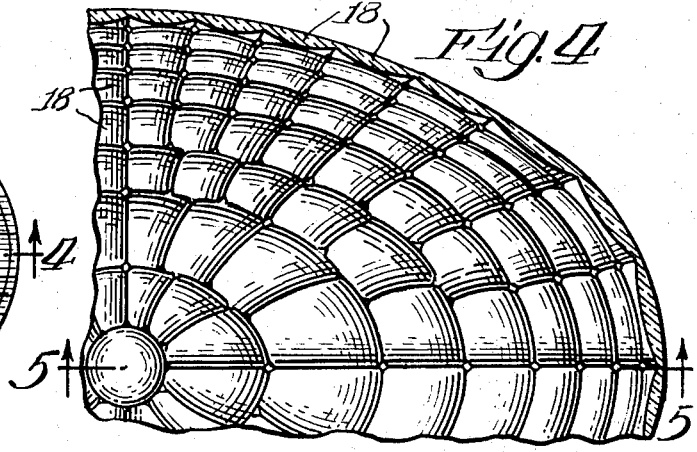
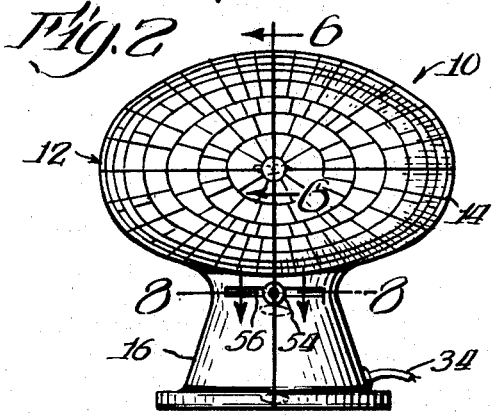
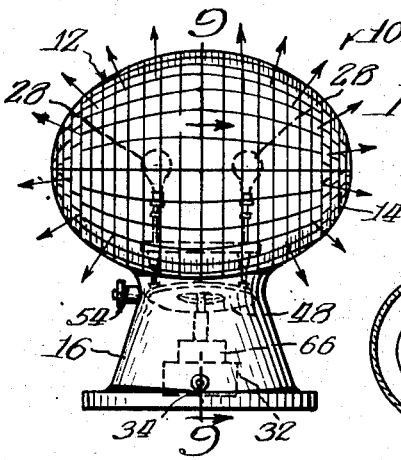
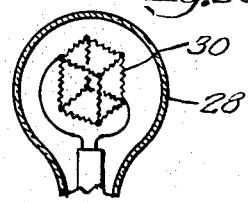
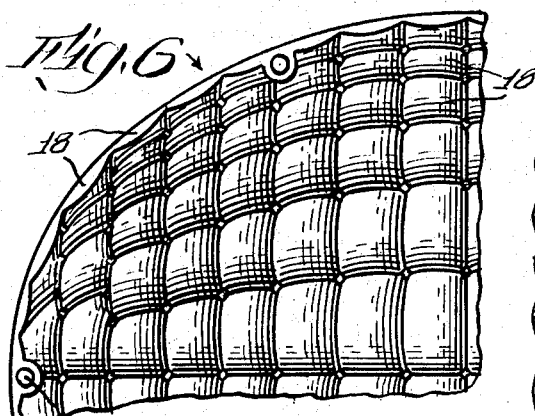
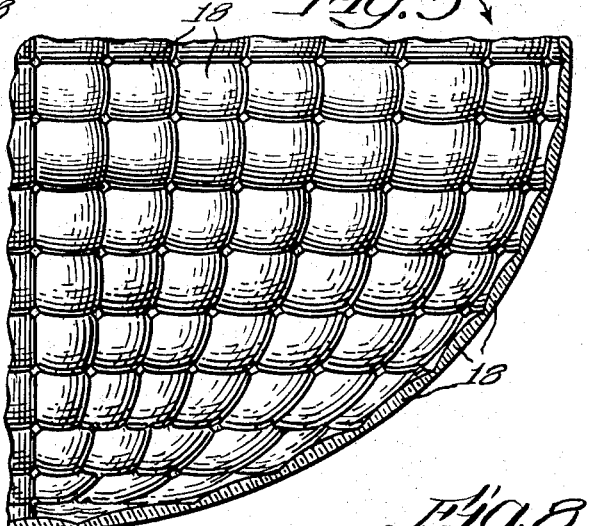
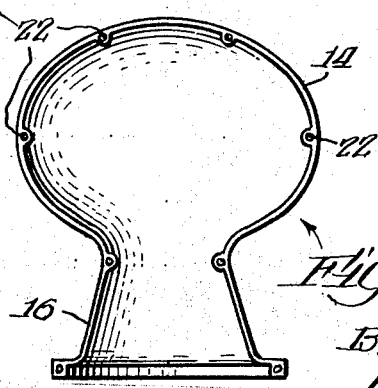
Inventor:
William B. Birch
By IRONS, BIRCH, SWINDLER & McKIE ATTYS

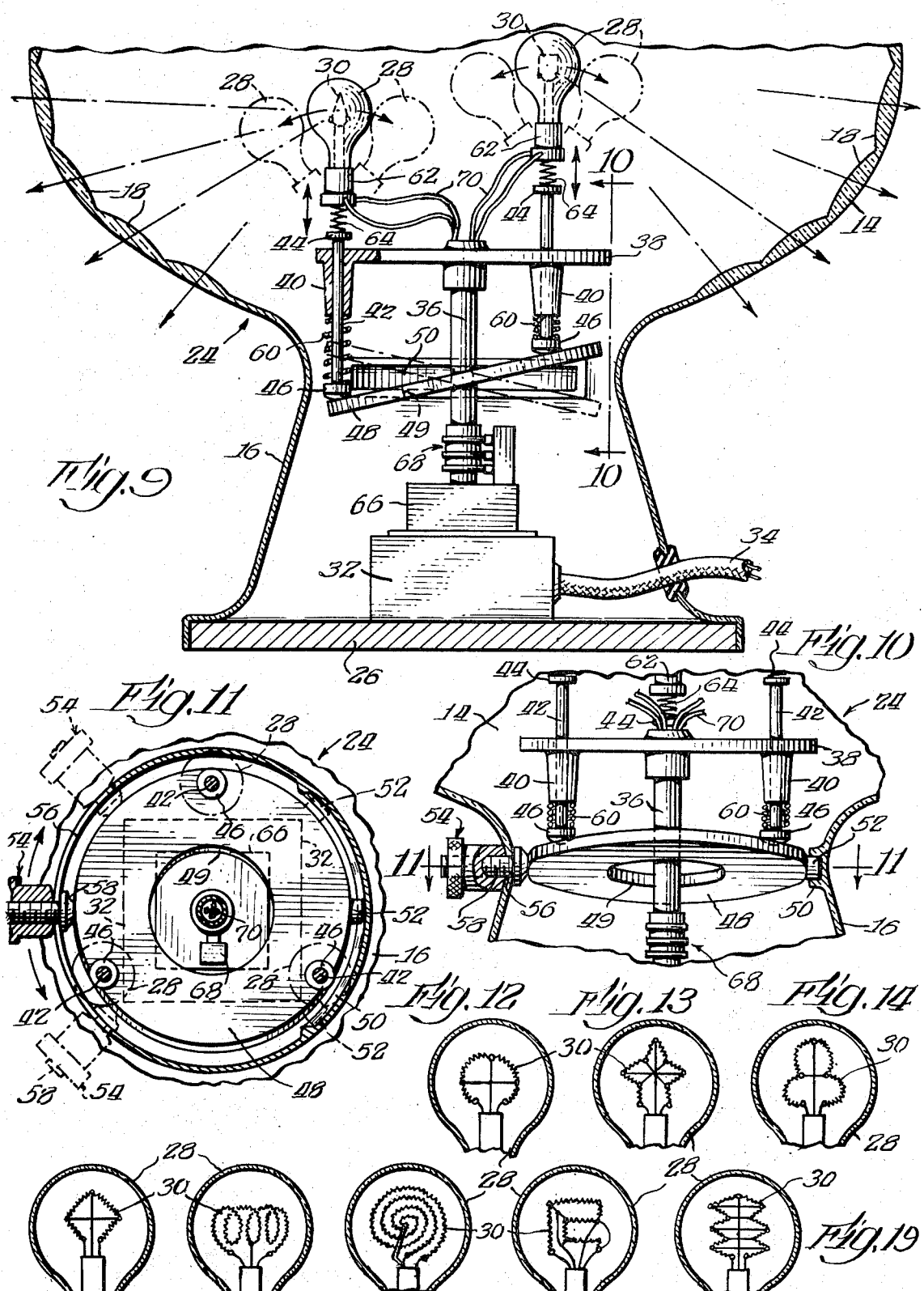

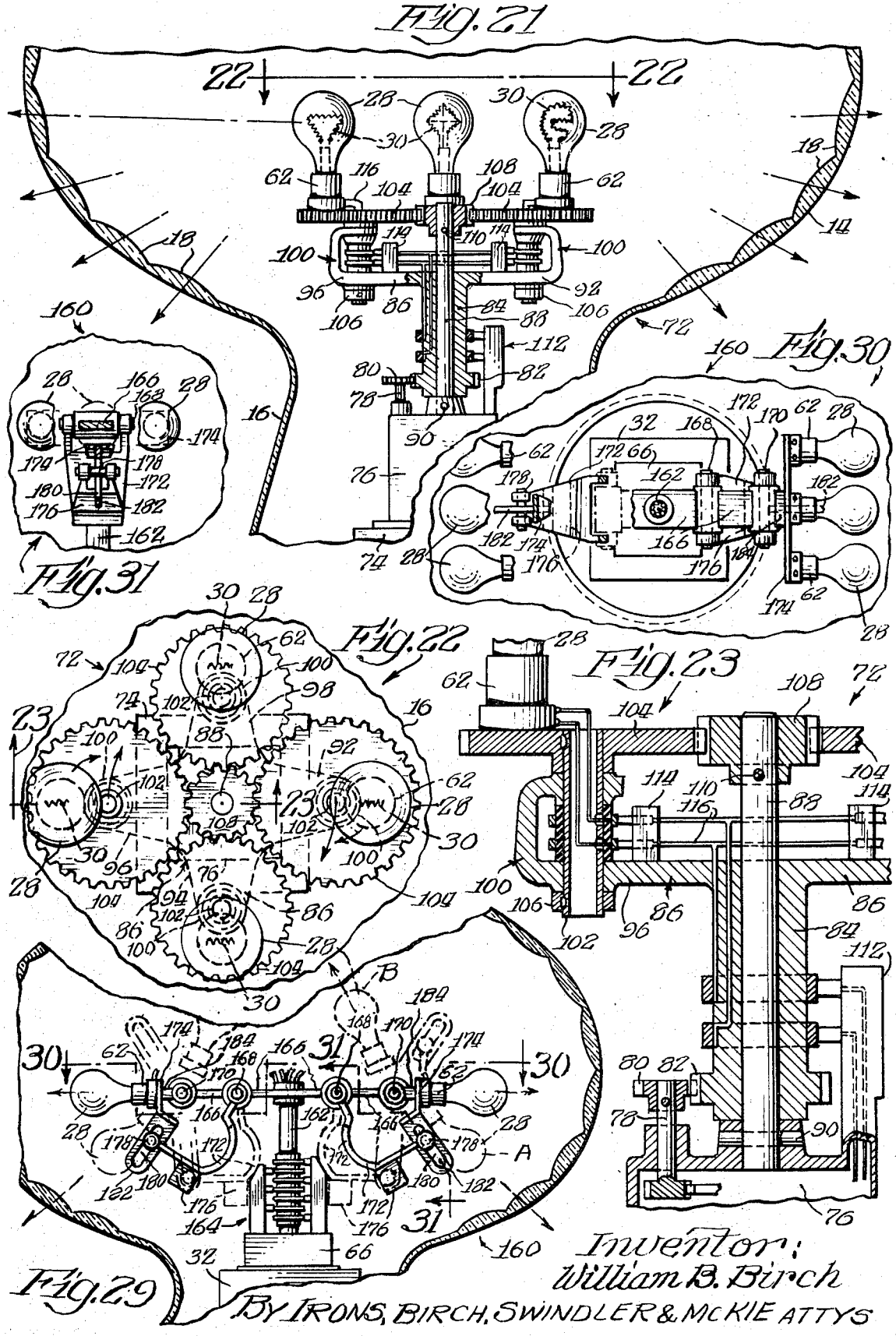

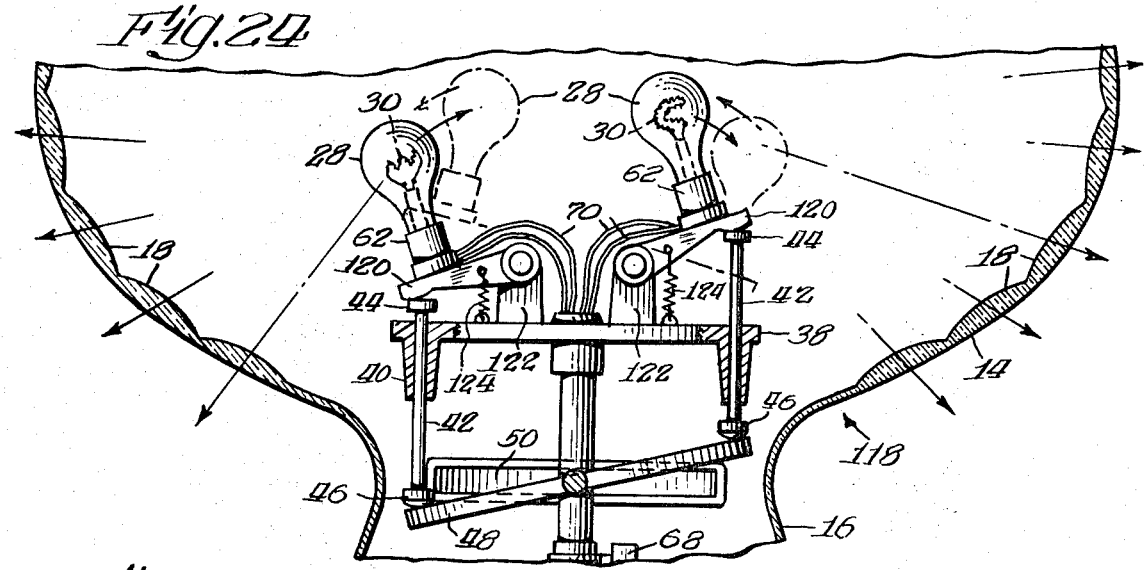
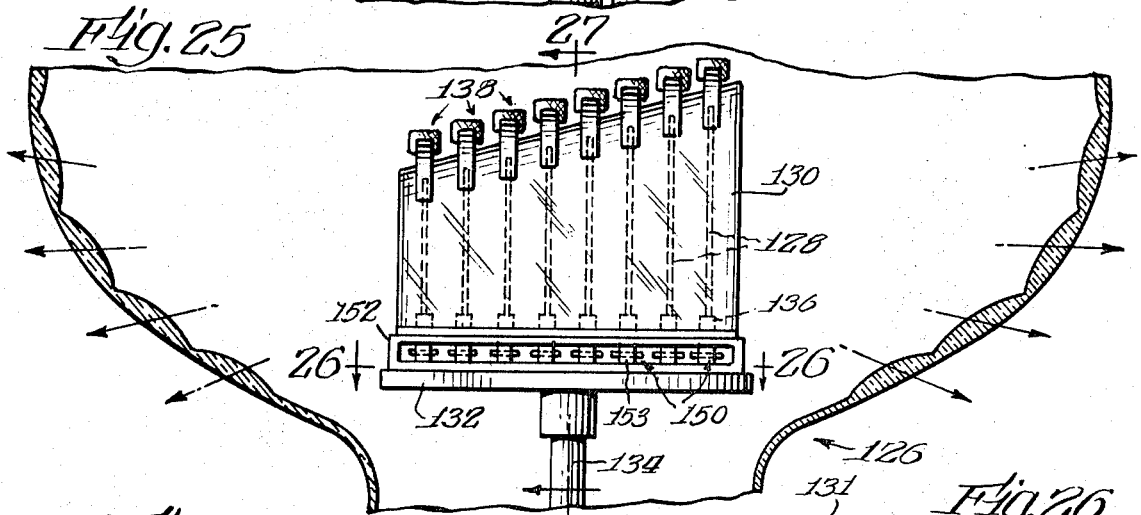
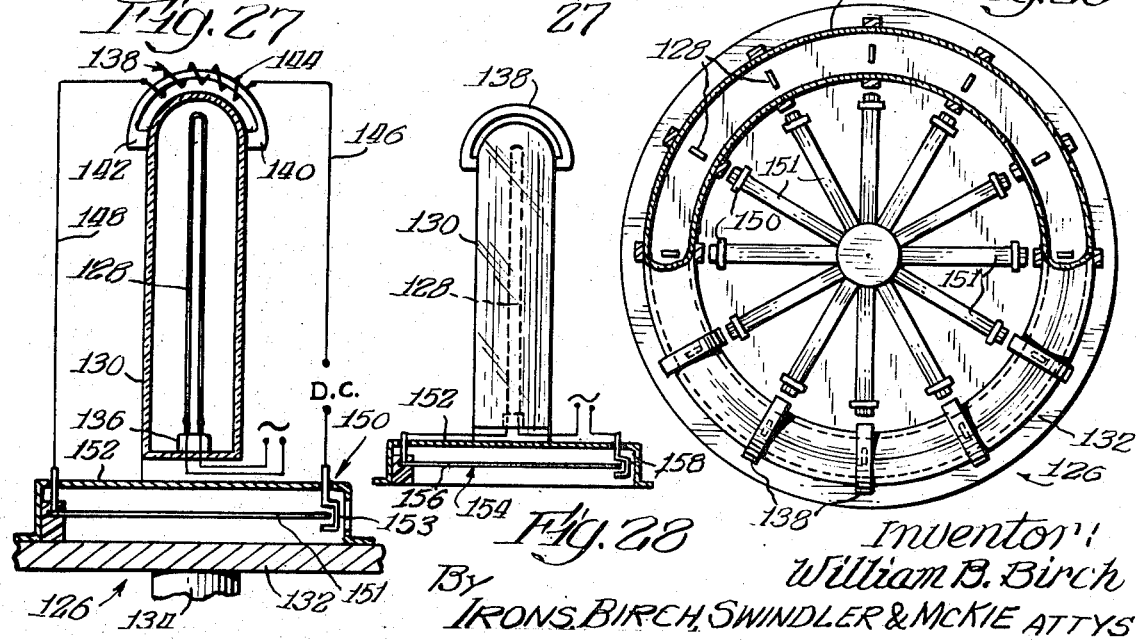

United States Patent Office 3,531,636
Patented Sept. 29, 1970

3,531,636
ORNAMENTAL LIGHT FIXTURE
William B. Birch, 405 Broome St.,
New York, N.Y. 10013
Filed June 26, 1968, Ser. No. 740,275
Int. Cl. F21p 3/00; F21s 3/12
U.S. Cl. 240—10.1
22 Claims

ABSTRACT OF THE DISCLOSURE

An ornamental light fixture having a plurality of illuminating devices contained within a translucent enclosure. The illuminating devices are moved continuously and simultaneously in a first and second path which gives an effect of random movement. There is also provided an apparatus for varying the intensity of the illuminating devices in response to an audio signal.

BACKGROUND OF THE INVENTION

Field of the invention

This invention relates to ornamental light fixtures, and specifically to light fixtures having illuminating means which are moved about within the fixture and which are varied in intensity in response to variations in an audio signal to produce decorative lighting effects.

Description of the prior art

Light fixtures of various types have been designed for producing decorative lighting effects in response to variations in an audio signal, such as music. Generally, such fixtures comprise one or more different colored lamps which are connected to a means for varying the intensity thereof in response to variations in the audio signal. Such fixtures also may include means for imparting movement to the lamps as well as varying the intensity thereof.

The decorative effectiveness of such fixtures is in large measure dependent upon the number and types of variations in the light projected therefrom. For example, variations in either the position, intensity or color of the light, or combinations of these variations, are the most commonly produced variants.

With respect to movement of the light, the prior art fixtures frequently include means for imparting a single cyclic movement to one or more lamps employed for generating the projected light. Obviously, to increase the movement of the light it would be desirable to impart not merely one but two simultaneous movements to such lamps.

The prior art fixtures also are generally constructed as projectors which are adapted to project light onto a single planar surface. Obviously, the effectiveness of a fixture would be increased if light were projected into the total environment surrounding the fixture instead of onto a single surface.

SUMMARY OF THE INVENTION

The ornamental light fixture of the present invention embodies several desirable structural features which maximize the number and types of variations in the light projected therefrom, and therefore maximize the decorative effectiveness of the fixture. Basically described, the fixture of the invention comprises a translucent enclosure, a plurality of illuminating means positioned within the enclosure and being operative to generate light which projects from the enclosure into the environment thereabout, means for simultaneously imparting first and second movements to the illuminating means so that movement will be imparted to the light projected from the enclosure, and means for varying the intensity of the light generated by the illuminating means in response to variations in an audio signal so that the intensity of the light projected from the enclosure will vary in correspondence to variations in the audio signal.

Desirably, the illuminating means comprise the filaments of different colored lamps. Preferably, the enclosure has a plurality of lenses on its surface which are operative to project images of the filaments into the surrounding environment. Also, to further increase the variations in the light projected from the fixture, such filaments may be of different configurations.

With the foregoing in mind it is an object of the invention to provide an ornamental light fixture for producing decorative lighting effects in response to variations in an audio signal.

It is also an object of the invention to provide an ornamental light fixture in which movement is imparted to a plurality of illuminating means, and in which the intensity of the illuminating means is varied in response to variations in an audio signal.

It is a further object of the invention to provide an ornamental light fixture in which first and second movements are simultaneously imparted to a plurality of illuminating means, and in which the intensity of the illuminating means is varied in response to variations in an audio signal.

It is an additional object of the invention to provide an ornamental light fixture having means for projecting moving images of one or more lamp filaments into the environment surrounding the fixture.

These and other objects of the invention will become apparent upon a consideration of the following detailed description of the preferred embodiments thereof given in connection with the following drawings.

BRIEF DESCRIPTION OF THE DRAWINGS

FIG. 1 is a plan view of the ornamental light fixture of the invention;

FIG. 2 is an end view of the fixture shown in FIG. 1;

FIG. 3 is a side view of the fixture shown in FIG. 1;

FIG. 4 is a sectional view taken on line 4—4 of FIG. 1, with the internal elements of the fixture being omitted for clarity;

FIG. 5 is a sectional view taken on line 5—5 of FIG. 4;

FIG. 6 is a sectional view taken on line 6—6 of FIG. 2, with the internal elements of the fixture being omitted for clarity;

FIG. 7 is a sectional view taken on line 7—7 of FIG. 1, with the internal elements of the fixture being omitted for clarity;

FIG. 8 is a sectional view taken on line 8—8 of FIG. 2;

FIG. 9 is a sectional view showing the internal elements of a first embodiment of the ornamental light fixture of the invention taken on line 9—9 of FIG. 3;

FIG. 10 is a sectional view taken on line 10—10 of FIG. 9;

FIG. 11 is a sectional view taken on line 11—11 of FIG. 10;

FIGS. 12–20 are vertical sectional views of lamps which may be used in the ornamental light fixture of the invention showing various filament configurations;

FIG. 21 is a view similar to FIG. 9 showing the internal elements of a second embodiment of the ornamental light fixture of the invention;

FIG. 22 is a sectional view taken on line 22—22 of FIG. 21;

FIG. 23 is a sectional view taken on line 23—23 of FIG. 22;

FIG. 24 is a view similar to FIG. 9 showing the internal elements of a third embodiment of the ornamental light fixture of the invention;

FIG. 25 is a view similar to FIG. 9 showing the internal elements of a fourth embodiment of the ornamental light fixture of the invention;

FIG. 26 is a plan view, partially in section, showing a modified illuminating means for the embodiment of the fixture shown in FIG. 25;

FIG. 27 is a sectional view taken on line 27—27 of FIG. 25;

FIG. 28 is a view similar to FIG. 27 showing a modified means for energizing the illuminating means of the embodiment of the fixture shown in FIG. 25;

FIG. 29 is a view similar to FIG. 9 showing the internal elements of a fifth embodiment of the ornamental light fixture of the invention;

FIG. 30 is a sectional view taken on line 30—30 of FIG. 29; and

FIG. 31 is a sectional view taken on line 31—31 of FIG. 29.

DESCRIPTION OF THE PREFERRED EMBODIMENTS

The ornamental light fixture of the invention is shown in FIGS. 1–3, as designated by reference numeral 10. Fixture 10 includes an enclosure 12 having an upper globe portion 14, which preferably is shaped as an oblate spheroid, and a lower base portion 16, which serves as a supporting pedestal for upper portion 14. Upper portion 14 is made of a translucent material, such as glass or clear plastic, to permit light rays to project from within fixture 10 into the environment thereabout, and has a plurality of inwardly convex lenses 18 formed on the inner surface thereof for a purpose described below.

Conveniently, enclosure 12 is formed in two halves, for example by injection molding, with one half of upper and lower portions 14 and 16 being formed as an integral unit, as shown in FIG. 7. The two halves of enclosure 12 conveniently are joined together and interlocked by a plurality of pins 20 and accommodating recesses 22 formed at the interface of the two halves.

Enclosure 12 or an equivalent enclosure is employed in each of the embodiments of the invention described below. Therefore, the foregoing description of the enclosure is applicable to the description of each such embodiment, wherein like reference numerals have been used for identifying like elements throughout.

Positioned within the enclosure of each embodiment of the invention are a plurality of illuminating means and associated elements for simultaneously imparting first and second movements to the illuminating means and for varying the intensity of the illuminating means in response to variations in an audio signal. The principal differences between the various embodiments are differences in the illuminating means and differences in the means for imparting movement thereto.

First embodiment

A first embodiment 24 of the fixture of the invention is shown in FIG. 9 having a bottom cover 26 positioned across and closing the bottom of lower portion 16. Cover 26 supports the illuminating means and associated element of fixture 24.

The illuminating means of fixture 24 comprise a plurality of lamps 28 each of which includes an electrically energized filament 30. Fixture 24 also includes means associated with lamp 28 for simultaneously imparting first and second movements thereto. Such means include a suitable power means, such as an electric motor 32 which is adapted to be connected to a conventional source of alternating current electric power by a lead 34, and which has a rotary output means, such as a shaft 36. Affixed to shaft 36 is a plate 38 which, upon energization of motor 32, is rotated about the axis of shaft 36.

Formed on the lower surface of plate 38 are a plurality of hollow bosses 40. A cam follower means is slidably mounted in each of bosses 40, comprising a push rod 42 having upper and lower headed end portions 44 and 46, respectively. As will be apparent from this description, push rods 42 are carried by and rotate with plate 38 about the axis of shaft 36.

A stationary camming means is spaced from plate 38 in the axial direction of shaft 30 for imparting oscillatory linear movement to push rods 42. The camming means conveniently comprises an annular disc 48 secured to lower portion 16 of the enclosure, and having a central opening 49 through which shaft 36 extends. To support disc 48 an arcuate track 50 is integrally formed on the inner surface of lower portion 16 for receiving a stud 52 affixed to the outer periphery of the disc. Also, a thumb screw mechanism 54 is slidably mounted in lower portion 16 in an arcuate slot 56 which is diametrically opposed to track 50. Mechanism 54 includes a stud 58 which is fixedly attached to the periphery of plate 42 in diametric opposition to stud 52, as shown in FIG. 11. The angular position of disc 48 may be adjusted by pivoting the disc about the axis defined by studs 52 and 58; and the rotational position of the disc may be adjusted by moving stud 52 and mechanism 54 along track 50 and slot 56, respectively.

As plate 38 carries push rods 42 about the axis of shaft 36, and portions 46 of the push rods engage plate 48 to thus impart oscillatory linear movement to the push rods. To insure that end portions 46 will engage plate 48 continuously, compression springs 60 are interposed between end portions 46 and the lower ends of bosses 40 to bias the end portions toward plate 48.

Lamps 28 are mounted in sockets 62, and the latter are connected to upper end portions 44 of push rods 42 by flexible coil springs 64. The rotary and oscillatory linear movements of push rods 42 cause lamps 28 to rock randomly from side-to-side on springs 64, as shown in phantom lines in FIG. 9. This rocking increases the movement of the light projected from fixture 24.

As mettioned hereinabove, a plurality of inwardly convex lenses 18 are formed on the inner surface of upper portion 14 of enclosure 12. The size of upper portion 14 is selected so that filaments 30 are positioned at approximately the focal length of lenses 18. Due to the movement of lamps 28, any one of the filaments will not be positioned at the focal length of all of lenses 18 at one time. However, as the lamps move about within enclosure 12, each filament will be positioned at approximately the focal length of one or more of the lenses at all times. Thus, the lenses will continuously project images of the filaments into the environment surrounding fixture 24, and due to the movement of the lamps, the images will blur and fade in an apparently random manner to thus increase the effectiveness of the fixture.

Fixture 24 also includes means for supply electric current to filaments 38 and varying the amount of such current in response to variations in an audio signal, to thereby vary the intensity of the light generated by the filaments in response to the variations in the audio signal. Such means comprises a suitable discriminator-amplifier 66 which conveniently is connected to an audio frequency output of a radio, phonograph, tape recorder or similar device (not shown). The details of discriminator-amplifier 66 form no part of the present invention; such devices being well known as shown, for example, in Blattner Pat. 1,654,068. The outputs from discriminator-amplifier 66 are connected by means of a conventional electrical brush and ring assembly 68 and wires 70 to filaments 30.

As disclosed in the above-mentioned Blattner patent, discriminator-amplifier 66 is operative to selectively energize filaments 30 in synchronism with frequency variations in the audio signal and to vary the intensity of the light generated by the filaments in correspondence with amplitude variations in the individual frequency ranges at which the respective filaments are energized. Desirably, a different colored light is generated by each filament to further increase the variations in the light projected from fixture 24.

Also, since images of the filaments are projected by lenses 18, the filaments preferably are of different configurations, for example, one of the filaments shown in FIG. 9 is triangularly shaped and another is rectangularly shaped. Various filaments are shown in FIGS. 12–20, these being merely illustrative of the many filament configurations which may be used.

As will be apparent from the foregoing description fixture 24 includes means for simultaneously imparting orbital and oscillatory linear movements to filaments 30; the orbital movement being rotary movement about the axis of shaft 36 imparted to the filaments by the rotation of plate 38, and the oscillatory linear movement being imparted to the filaments by the oscillatory linear movement of push rods 42. In addition to these two movements, the filaments will experience random rocking movement on springs 64.

Second embodiment

A second embodiment 72 of the fixture of the invention is shown in FIGS. 21–23. Fixture 72 includes means for simultaneously imparting first and second orbital movements about different axes to filaments 30. Such means include an electric motor 74 having a rotary output shaft which is coupled to a transmission housed in a case 76. The transmission also has a rotary output shaft 78 to which is affixed a gear 80. Also housed in case 78 are the components of a discriminator-amplifier which is similar to discriminator-amplifier 66 employed in fixture 24.

Gear 80 is drivingly coupled to a gear 82 which is integrally formed at the lower end of a hollow shaft 84. Shaft 84 is rotatably mounted on a stationary shaft 88 which is affixed to the top of housing 76 by a pin 90. As will be apparent from this description, upon energization of motor 74 gear 82 and shaft 84 will be rotatably driven about shaft 88 by gear 80.

Integrally affixed to the upper end of shaft 84 for rotation therewith is a plate 86 comprising four outwardly extending arms 92, 94, 96 and 98. Each of the arms carries a C-shaped bearing mount 100 at its outer end in which is journaled a shaft 102. Affixed to the upper end of each shaft 102 is a disc 104 having a plurality of gear teeth formed at its periphery. A collar 106 is affixed to the lower end of each shaft 102 to retain the shaft in the associated bearing mount 100.

The gear teeth on discs 104 engages a gear 108 which is affixed to the upper end of stationary shaft 88 by a pin 110. Discs 104 and gear 108 thus comprise a planetary gear drive, with discs 104 comprising rotatable planetary gears and gear 108 comprising a stationary sun gear. Thus, upon the rotation of plate 86 about the axis of shaft 84, each disc 104 is rotated about the axis of the associated shaft 102 by sun gear 108.

A socket 62 having a lamp 28 mounted therein is eccentrically mounted on each disc 104. Thus, when the discs are simultaneously rotated about the axes of shafts 84 and 102, two orbital movements about different axes will be simultaneously imparted to each of the filaments 30.

As mentioned before, a suitable discriminator-amplifier is mounted within housing 76. The discriminator-amplifier is connected to filaments 30 by a primary electrical brush and ring assembly 112 associated with shaft 84, secondary electrical brush and ring assemblies 114 associated with each shaft 102, and suitable connecting wires 116. For purposes of clarity only two of the brushes and rings of assembly 112 are shown in the drawings, it being understood, however, that a sufficient number of brushes and rings may be provided for supplying current to each filament 30 individually.

As in fixture 24, images of filaments 30 are projected from fixture 72 by lenses 18 as the filaments are moved about within the fixture.

Third embodiment

A third embodiment 118 of the fixture of the invention is shown in FIG. 24. Fixture 118 is generally similar to fixture 24; the principal difference between the fixtures being the different means employed for operatively connecting lamps 28 to plate 38.

In fixture 118 each of the sockets 62 in which lamps 28 are mounted is attached to an arm 120. The inner end of each arm is pivotally connected to a lug 122 affixed to the upper surface of plate 38. The outer end of each arm engages the upper headed portion 44 of one of the push rods 42. A tension spring 124 is connected between plate 38 and each arm 120 for biasing the outer end of each arm toward the associated push rod 42 to thus insure that the arm will engage headed portion 44 of the associated push rod continuously.

As will be apparent from this description, as push rods 42 reciprocate in bosses 40, arms 120 will be pivotally oscillated about their connections to lugs 122 and oscillatory arcuate movement will be imparted to filaments 30. Thus, orbital and oscillatory arcuate movements will be simultaneously imparted to filaments 30 of fixture 118.

Fourth embodiment

A fourth embodiment 126 of the fixture of the invention is shown in FIGS. 25–28. The illuminating means for fixture 126 comprise a plurality of filaments 128 which are mounted in a row within a linearly extending, translucent envelope 130, composed for example of glass. Alternatively, instead of employing a linearly extending envelope, with the filaments arranged in a row, the envelope may be annularly shaped, such as envelope 131 shown in FIG. 26, with the filaments arranged in a ring. Also, if desired, less than the total number of filaments may be mounted within each of a plurality of envelopes, preferably, however, all of the filaments are mounted within a single envelope.

Envelope 130 and filaments 128 are mounted on a plate 132 which is affixed to a rotatably driven shaft 134. Shaft 134 may be driven by an electric motor similar to motor 32 of fixture 24.

Each filament 128 is made of a metallic material, such as an alloy of tungsten, and is supported only at its lower end by a filament pedestal 136. As shown in FIG. 27, a small magnet 138 is positioned about the periphery of envelope 130 adjacent the top of each filament 128. Each magnet 138 includes a pair of opposed pole pieces 140 and 142 which are disposed on either side of the associated filament 128. The magnet is energized by a coil 144 which is connected by a wire 148 to a tuned reed switch 150, and by a wire 146 to an amplified audio signal. The source of the amplified audio signal conveniently may be a conventional audio amplifier which is connected to an audio signal output from a radio, phonograph, tape recorder or similar device. Switch 150 is interposed between envelope 130 and plate 132 in a suitable housing 152.

Each of switches 150 includes an electrically conductive tuned reed 151 and a C-shaped contact 153 disposed about the end of reed 151 and connected to the amplified audio signal. Each of reeds 151 is vibratingly responsive to the impression thereon of an electric current of a particular audio frequency. Thus, when an electric current of the responsive frequency of a particular reed is impressed thereon, the end of the reed vibrates within contact 153 and cyclically closes the energizing circuit of coil 144. When this occurs, a cyclic magnetic field will be generated between pole pieces 140 and 142 in proximity to the associated filament 128. This magnetic field will interact with the magnetic field generated about the filament by the energizing current flowing therethrough. The resulting interaction of the two fields will impart vibratory movement to the filament. Thus, orbital and vibratory movements will be simultaneously imparted to filaments 128 of fixture 126.

If desired and as shown in FIG. 27, all of the filaments may be connected to a common source of alternating current electric power so that the intensity of the light generated by each filament will remain constant. Preferably, however, and as shown in FIG. 28, filaments 128 will be individually connected by reed switches 154 to the amplified audio signal. Switches 154 are similar to switches 151, each including a frequency responsive, electrically conductive tuned reed 156 and a C-shaped contact 158. Thus, the end of each reed 156 will vibrate within the associated contact 158 when an electric current of the responsive frequency of that reed is impressed thereon, and the individual filaments will thereby be energized in response to variations in the frequency of the audio signal.

The amplitude of the vibrations of a particular reed 156 are directly dependent upon the amplitude of the current at the responsive frequency of that reed. Further, the time that a particular reed remains engaged with the associated contact during each half of the reed's vibratory cycle, is dependent upon the amplitude of the reed's vibrations. And, the intensity of the light generated by each filament is dependent upon both the time that the energizing circuit for the filament is closed and the amplitude of the energizing current. Thus, the intensity of the light generated by each filament 128 is dependent upon and responsive to the amplitude of the audio signal at the responsive frequency of the associated reed switch 154. For purposes of clarity, in FIG. 28 reed switch 150 and the energizing circuit for magnet 138 have been omitted, it being understood, however, that vibratory movement will be imparted to the filament as described above.

One advantage of fixture 126 is that it does not require a discriminator-amplifier as do the other embodiments of the invention since the reeds of switches 150 and 154 perform the function of discriminating between different frequencies.

Fifth embodiment

A fifth embodiment 160 of the fixture of the invention is shown in FIGS. 29–31. Fixture 160 includes an electric motor 32, similar to the motor employed in the embodiment shown in FIGS. 9–11, having a shaft 162. Also, as in several of the previous embodiments, fixture 160 includes a discriminator-amplifier 66 for varying the intensity of the light generated by the filaments of a plurality of lamps 28 in response to variations in an audio signal. The discriminator-amplifier is connected to the filaments by a conventional electrical brush and ring assembly 164 and a plurality of wires.

A plate comprising an elongated rectangular arm 166 is connected at its geometric center to the upper end of shaft 162 for rotation therewith. Intermediate the center and each end of the arm, a lever 172 is connected thereto by a pivotal connection 168 to be carried about the axis of shaft 162 by the arm. Levers 172 are substantially L-shaped having weights 176 and pins 178 attached thereto.

An arm extension 184 is pivotally connected to each end of arm 166 by a pivotal connection 170. Affixed to the extremity of each extension 184 is a bracket 174 which is carried about the axis of shaft 162 by arm 166 and to which are attached a plurality of sockets 62 in which lamps 28 are mounted. Also affixed to each bracket 174 is a link 182 having an elongated slot 180 therein. Pins 178, which are carried by levers 172, extend through and coact with slots 180.

When motor 32 is de-energized and arm 166 is stationary, weights 176, under the influence of gravity, remain directly under pivotal connections 168 as shown in phantom lines in FIG. 29. When the weights are in this position, lamps 28 will be held in the position designated A by the mechanical linkage system formed by arm 166, levers 172, arm extensions 184, brackets 174, links 182 and pins 178.

When motor 32 is energized and arm 166 is rotating about the axis of shaft 162, weights 176 move outwardly under the influence of centrifugal force, which in turn to raise lamps 28. If sufficient rotational speed is imparted to arm 66, weights 176 will move outwardly until the inner legs of levers 172 extend substantially horizontally outwardly from connections 168. To permit the levers to assume this position, the inner leg of each lever includes a curved portion within which connection 170 is accommodated when the inner leg extends substantially horizontally outwardly from connection 168. When the levers are in this position, the aforementioned mechanical linkage system causes lamps 28 to be moved to the position designated B in FIG. 29. As will be apparent from this description, the mechanical linkage system is thus effective for moving lamps 28 through an arc of approximately 170 degrees as a function of the rotational speed of arm 166.

Motor 32 of fixture 160 preferably is connected to an output from discriminator-amplifier 66 so that the rotational speed of the motor will be varied in correspondence with selected variations in the audio signal. By varying the rotational speed of motor 32 and consequently the rotational speed of arm 166, lamps 28 will be caused to oscillate between positions A and B so that rotary and oscillatory arcuate movement will be simultaneously imparted to the filaments within the lamps.

If desired this latter feature also may be incorporated in the previously described embodiments of the invention which employ a discriminator-amplifier similar to discriminator-amplifier 66, so that the movements, as well as the intensity, of the illuminating means will be responsive to variations in an audio signal.

While the foregoing constitutes a detailed description of the preferred embodiments of the invention it is understood that various modifications thereof will occur to those skilled in the art. Therefore the invention is to be limited solely by the scope of the claims appended hereto.

I claim:
1. An ornamental light fixture comprising:
   a translucent enclosure;
   a plurality of illuminating means positioned within said enclosure and being operative to generate light which projects from said enclosure into the environment thereabout;
   means for continuously, simultaneously imparting first and second movements to said illuminating means so that movement will be imparted to the light projected from said enclosure; and
   means for varying the intensity of the light generated by said illuminating means in response to variations in an audio signal so that the intensity of the light projected from said enclosure will vary in correspondence to variations in said audio signal.

2. An ornamental light fixture as recited in claim 1, wherein said first movement is orbital movement about an axis.

3. An ornamental light fixture as recited in claim 2, wherein said second movement is oscillatory linear movement.

4. An ornamental light fixture as recited in claim 2, wherein said second movement is oscillatory arcuate movement.

5. An ornamental light fixture as recited in claim 2, wherein said second movement is orbital movement about an axis different from said first-mentioned axis.

6. An ornamental light fixture as recited in claim 2, wherein said second movement is vibratory movement.

7. An ornamental light fixture as recited in claim 1, wherein said illuminating means comprises a plurality of electrically energized filaments.

8. An ornamental light fixture as recited in claim 7, wherein said filaments have different configurations.

9. An ornamental light fixture as recited in claim 7, wherein said enclosure has a plurality of lenses on the surface thereof, said lenses being operative to project images of said filaments from said enclosure.

10. An ornamental light fixture as recited in claim 1, wherein said means for imparting said first movement to said illuminating means comprises; a power means having a rotary output means, and mounting mens operatively connected to and driven by said output means for orbital movement about an axis; and wherein said illuminating means are operatively connected to said mounting means for orbital movement therewith about said axis.

11. An ornamental light fixture as recited in claim 10, wherein said illuminating means comprises electrically energized filaments; and wherein said means for imparting said second movement to said illuminating means comprises means for imparting vibratory movement to said filaments.

12. An ornamental light fixture as recited in claim 11, wherein said filaments are made of a metallic material; and wherein said mens for imparting vibratory movement to said filaments comprises means for generating a magnetic field in proximity to said filaments.

13. An ornamental light fixture as recited in claim 10, wherein said output means comprises a shaft, and said mounting means comprises a plate affixed to and driven by said shaft about the axis of rotation of said shaft; and wherein said illuminating means are operatively connected to said plate for rotation therewith about the rotary axis of said shaft.

14. An ornamental light fixture as recited in claim 13, wherein said means for imparting said second movement to said illuminating means comprises; a camming means spaced from said plate in the axial direction of said shaft, and a plurality of cam follower means carried by and extending through said plate and engaging said camming means so that as said follower means are carried by said plate about the axis of rotation of said shaft, said camming means will impart oscillatory linear movement thereto; and wherein said illuminating means are operatively connected to said follower means for oscillatory linear movement therewith.

15. An ornamental light fixture as recited in claim 13, wherein said means for imparting said second movement to said illuminating means comprises; a camming means spaced from said plate in the axial direction of said shaft, and a plurality of cam follower means carried by and extending through said plate and engaging said camming means so that as said follower means are carried by said plate about the axis of rotation of said shaft, said camming means will impart oscillatory linear movement thereto; and wherein each of said illuminating means is operatively connected to an arm, one end of each said arm being pivotally connected to said plate and the other end of each said arm engaging one of said follower means so that upon oscillatory linear movement of said follower means, said arms will be pivotally oscillated about their connections to said plate to thereby impart oscillatory arcuate movement to said illuminating means.

16. An ornamental light fixture as recited in claim 13, wherein said means for imparting said second movement to said illuminating means comprises; a plurality of levers carried by and pivotally connected to said plate, each said lever having a weight affixed thereto, and a plurality of brackets carried by and pivotally connected to said plate, each said bracket being operatively connected to one of said levers so that as said levers and brackets are carried by said plate about the axis of rotation of said shaft, said weights will move outwardly under the influence of centrifugal force to thereby impart arcuate movement to said brackets; and wherein said illuminating means are operatively connected to said brackets so that upon arcuate movement of said brackets, arcuate movement also will be imparted to said illuminating means.

17. An ornamental light fixture as recited in claim 16, further including means for varying the rotational speed of said shaft in response to variations in said audio signal so that said weights will oscillate outwardly and inwardly under the influence of centrifugal and gravitational forces to thereby impart oscillatory arcuate movement to said brackets and illuminating means.

18. An ornamental light fixture as recited in claim 13, wherein said illuminating means comprise electrically energized filaments; and wherein said means for imparting said second movement to said illuminating means comprises means for imparting vibratory movement to said filaments.

19. An ornamental light fixture as recited in claim 18, wherein said filaments are made of a metallic material; and wherein said means for imparting vibratory movement to said filaments comprises means for generating a magnetic field in proximity to said filaments.

20. An ornamental light fixture as recited in claim 10, wherein said output means comprises a first shaft, and said mounting means comprises a second shaft operatively coupled to and driven by said first shaft about an axis of rotation and a plate affixed to said second shaft; and wherein said illuminating means are operatively connected to said plate for rotation therewith about the rotary axis of said second shaft.

21. An ornamental light fixture as recited in claim 20, wherein said means for imparting said second movement to said illuminating means comprises; a fixedly mounted third shaft extending in the axial direction of said second shaft and a plurality of discs carried by and rotatably mounted on said plate and operatively coupled to said third shaft so that as said discs are carried by said plate about the axis of rotation of said second shaft, said third shaft will impart rotary movement thereto about the individual mounting axes of said discs on said plate; and wherein said illuminating means are operatively connected to said discs for rotary movement therewith about said individual mounting axes.

22. An ornamental light fixture as recited in claim 21, wherein said discs are operatively coupled to said third shaft by gear means.

References Cited

UNITED STATES PATENTS

| | | | |
|---|---|---|---|
| 2,073,062 | 3/1937 | Henninger | 40—106.52 |
| 2,411,935 | 12/1946 | O'Farrell | 240—48 |
| 3,205,755 | 9/1965 | Sklar | 240—10 XR |
| 3,235,722 | 2/1966 | Burnbaum | 240—10.1 |

JOHN M. HORAN, Primary Examiner

J. F. PETERS, Jr., Assistant Examiner

U.S. Cl. X.R.

40—106.52; 240—48